(12) United States Patent
Hirata et al.

(10) Patent No.: US 8,540,832 B2
(45) Date of Patent: Sep. 24, 2013

(54) LAMINATED CERAMIC ELECTRONIC COMPONENT AND MANUFACTURING METHOD THEREFOR

(75) Inventors: Yosuke Hirata, Nagaokakyo (JP);
Hideaki Tsuji, Nagaokakyo (JP);
Nagato Omori, Nagaokakyo (JP);
Hiroyuki Wada, Nagaokakyo (JP);
Takashi Hiramatsu, Nagaokakyo (JP);
Yoshito Saito, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 179 days.

(21) Appl. No.: 13/004,213

(22) Filed: Jan. 11, 2011

(65) Prior Publication Data

US 2011/0110014 A1 May 12, 2011

Related U.S. Application Data

(63) Continuation of application No. PCT/JP2010/058618, filed on May 21, 2010.

(30) Foreign Application Priority Data

Jun. 15, 2009 (JP) .................................. 2009-141866
Jul. 1, 2009 (JP) .................................. 2009-156655

(51) Int. Cl.
*C03B 29/00* (2006.01)
(52) U.S. Cl.
USPC .................... 156/89.11; 156/89.12; 156/89.16
(58) Field of Classification Search
USPC ........................................... 156/89.16, 89.12
See application file for complete search history.

(56) References Cited

U.S. PATENT DOCUMENTS

| | | | | |
|---|---|---|---|---|
| 4,039,338 A | * | 8/1977 | Swiss et al. | 501/153 |
| 4,490,319 A | * | 12/1984 | Lee et al. | 264/603 |

(Continued)

FOREIGN PATENT DOCUMENTS

| | | |
|---|---|---|
| JP | 06267785 A | 9/1994 |
| JP | 10-149941 A | 6/1998 |

(Continued)

OTHER PUBLICATIONS

International Search Report issued for PCT/JP2010/058618, date of completion Jul. 15, 2010.

(Continued)

*Primary Examiner* — Philip Tucker
*Assistant Examiner* — Alex Efta
(74) *Attorney, Agent, or Firm* — Dickstein Shapiro LLP

(57) ABSTRACT

Changes in states giving rise to electrode breakage and ball formation are made less likely during firing step for sintering the laminated body, and the improvement in DC bias characteristics is achieved in laminated ceramic electronic components with a laminated body which has internal electrodes, even when ceramic layers and the internal electrodes are reduced in thickness. The laminated body is divided into a large grain region in which the ceramic has a relatively large grain diameter and a small grain region in which the ceramic has a relatively small grain diameter. The large grain region is located outside the small grain region, and a boundary surface between the large grain region and the small grain region is located inside the outer surface of the laminated body while surrounding a section in which the internal electrodes are present in the laminated body. In order to obtain the laminated body, a heat treatment is carried out in the firing step with a temperature profile in which the average rate of temperature increase from room temperature to the maximum temperature is 40° C./second or more.

10 Claims, 10 Drawing Sheets

(56) References Cited

U.S. PATENT DOCUMENTS

| | | | | |
|---|---|---|---|---|
| 5,260,094 A | * | 11/1993 | Giannelis et al. | 427/79 |
| 5,391,339 A | * | 2/1995 | Wei et al. | 264/666 |
| 2012/0140376 A1 | * | 6/2012 | Ishihara et al. | 361/301.4 |

FOREIGN PATENT DOCUMENTS

| | | |
|---|---|---|
| JP | 10-241987 A | 9/1998 |
| JP | 2000216042 A | 8/2000 |
| JP | 2002289457 A | 10/2002 |
| JP | 2006165259 A | 6/2006 |
| JP | 2008226941 A | 9/2008 |
| KR | 20060135249 A | 12/2006 |

OTHER PUBLICATIONS

Written Opinion of the International Searching Authority, mailed Jul. 2, 2010.

* cited by examiner

Fig. 1
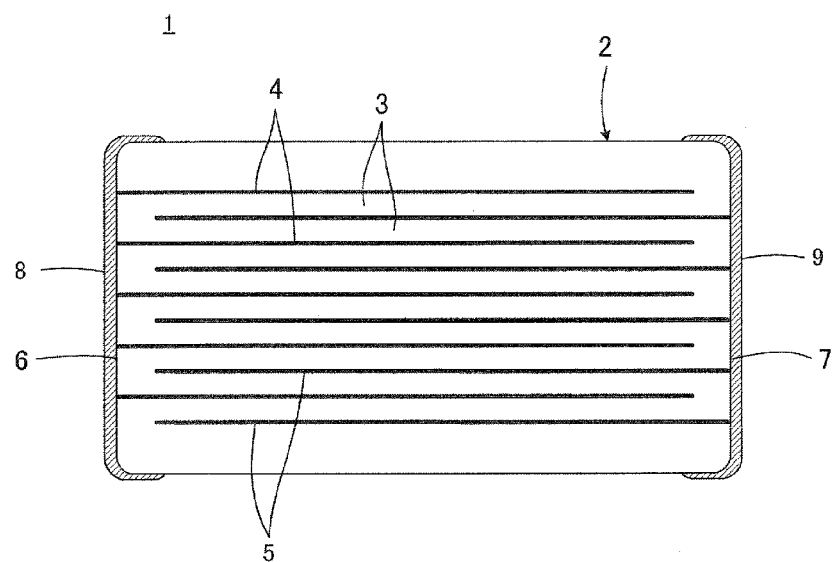
Fig. 2A
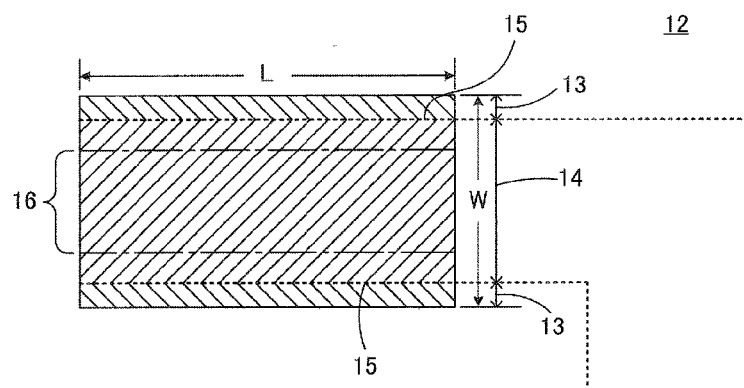
Fig. 2B
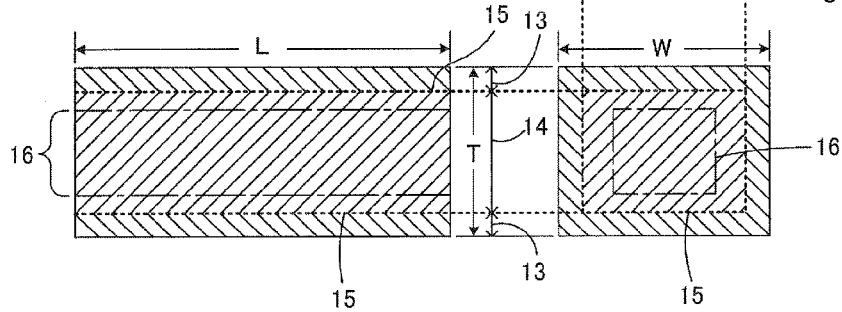
Fig. 2C

COMPARATIVE EXAMPLE

3 μm

EXAMPLE

COMPARATIVE EXAMPLE

EXAMPLE

COMPARATIVE EXAMPLE

EXAMPLE

COMPARATIVE EXAMPLE

EXAMPLE

COMPARATIVE EXAMPLE

EXAMPLE

[Fig. 12]
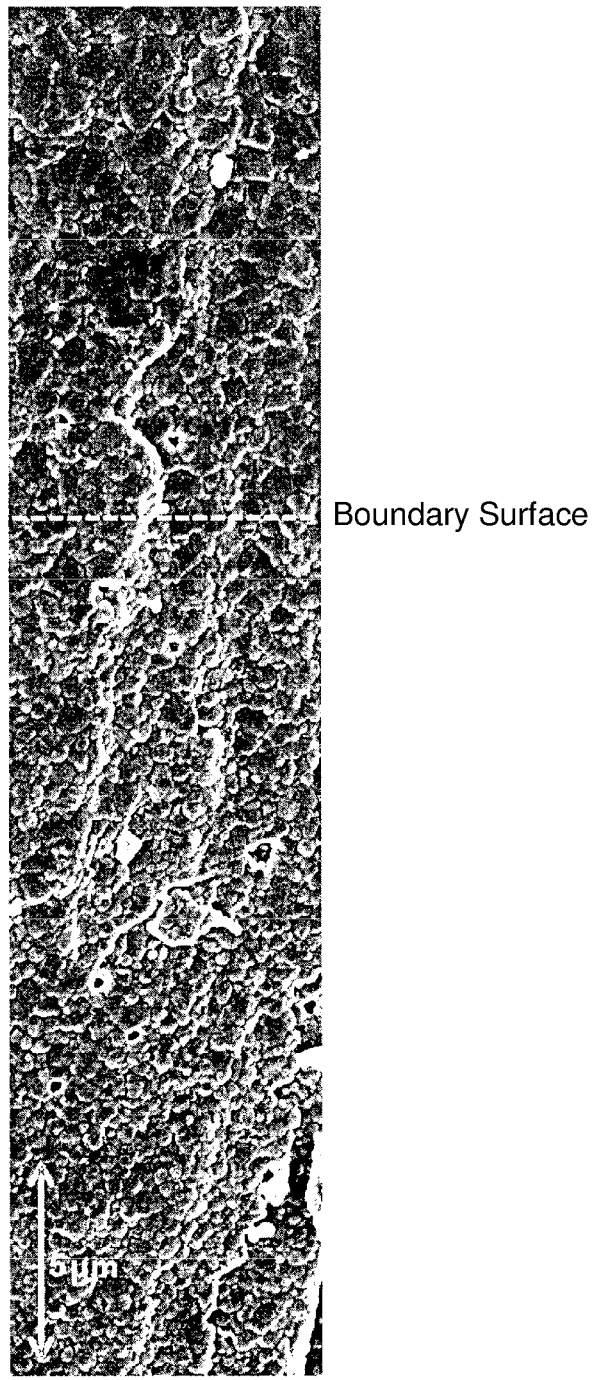

US 8,540,832 B2

LAMINATED CERAMIC ELECTRONIC COMPONENT AND MANUFACTURING METHOD THEREFOR

This is a continuation of application Serial No. PCT/JP2010/058618, filed May 21, 2010, the contents of which are hereby incorporated herein by reference.

TECHNICAL FIELD

The present invention relates to a laminated ceramic electronic component and a method for manufacturing the laminated ceramic electronic component, and more particularly, relates to a technique which can be advantageously adopted for size reduction of a laminated ceramic electronic component.

BACKGROUND ART

For the reduction of size (reduction in thickness) in, for example, a laminated ceramic capacitor, it is effective to reduce in layer thickness of not only the ceramic layers but also the internal electrodes. However, the reduction in the layer thickness of the internal electrodes makes it likely to cause electrode breakage during the firing step for sintering the raw laminated body. For preventing this electrode breakage, the following techniques, for example, have been proposed.

Japanese Patent Application Laid-Open No. 2008-226941 (Patent Document 1) prevents electrode breakage and achieves an electrode thickness of 0.8 to 1 μm by adopting a rate of temperature increase of 500° C./hour to 5000° C./hour in the firing step.

Japanese Patent Application Laid-Open No. 2000-216042 (Patent Document 2) prevents structural defects such as cracks in such a way that the reliability of a laminated ceramic capacitor obtained is enhanced, by adopting a rate of temperature increase of 500° C./hour or more in the 700° C. to 1100° C. range of the temperature increase process for firing, an oxygen partial pressure of $10^{-8}$ atm or less in the atmosphere at 1100° C. or more, and an oxygen partial pressure of $10^{-8}$ atm or more partially at 1100° C. or less in a temperature decrease process.

Korean Patent Application Laid-Open No. 10-2006-0135249 (Patent Document 3) achieves a balance between the prevention of electrode breakage and the prevention of overshooting the desired maximum firing temperature during a temperature increase by increasing the temperature up to the temperature 20° C. lower than the maximum temperature at a rate of 10° C./second.

While the effect of allowing reducing the layer thickness of the internal electrodes is achieved by means such as increasing the rate of temperature increase in the prior art described in any of Patent Documents 1 to 3 described above, the effect is limited, and for example, in a laminated ceramic capacitor including internal electrodes containing Ni as a conductive constituent, it is extremely difficult to achieve 0.3 μm or less as an electrode thickness after firing.

In addition, the atmosphere for firing a raw laminated body including internal electrodes using a base metal as a conductive constituent is, for example, a $N_2/H_2/H_2O$ system, and it is necessary to control the atmosphere to a more reducing side than the Ni/NiO balance oxygen partial pressure, which restricts the equipment and material design.

In addition, it is also effective to use a low-temperature sintered ceramic material in order to achieve the reduction in the layer thickness of the internal electrodes. The low-temperature sintered ceramic material may contain volatile constituents such as Li, and the volatile constituents tend to scatter during firing. Furthermore, the residual amount of the volatile constituents is likely to vary depending on the size of a raw laminated body to be fired, that is, the chip size, and the amount charged to the firing furnace, and it is difficult to suppress this variation in the residual amount.

Reduction in the thickness of the ceramic layers is also effective for reducing the size of the laminated ceramic capacitor as described above. However, the reduction in the thickness of the ceramic layers may lead to the following problems.

With the advance in reducing the thickness of the ceramic layers, the intensity of the direct-current electric field applied to the ceramic layers is further increased. In general, a ferroelectric ceramic is used for ceramic layers of a laminated ceramic capacitor with a relatively high capacitance per unit volume. However, the ferroelectric ceramic has the property that its dielectric constant is decreased when a large direct-current voltage is applied to it. Furthermore, the ferroelectric ceramic has a tendency to increase the rate of decrease in dielectric constant due to the application of the direct-current voltage when the dielectric constant is higher, and when the intensity of the direct-current electric field applied is higher.

The currently required reduction in the thickness of the ceramic layers has been advanced to result in an increase in the direct-current voltage per the thickness of the ceramic layer, thereby decreasing the dielectric constant of the dielectric ceramic at the direct-current voltage, and in return, decreasing the capacitance of the laminated ceramic capacitor at the direct-current voltage. More specifically, the reduction in the thickness of the ceramic layers has been already advanced to such an extent that it is difficult to achieve an increase in the capacitance of the laminated ceramic capacitor even if the reduction in the thickness of the ceramic layers is further advanced.

Accordingly, laminated ceramic capacitors have been desired which are less likely to decrease the dielectric constant of the dielectric ceramic, that is, superior in terms of DC bias characteristics, even when the intensity of the direct-current electric field applied is increased. For example, a technique described in Japanese Patent Application Laid-Open No. 2006-165259 (Patent Document 4) considers material compositions in order to improve the DC bias characteristics. However, in the case of changing the material compositions, it is difficult to achieve a balance with other characteristics (dielectric constant, temperature characteristics, reliability, etc.), leading to the problem of limiting the design flexibility.

It is to be noted that while the problems described above are associated with laminated ceramic capacitors, laminated ceramic electronic components other than laminated ceramic capacitors can also encounter the same problems.

PRIOR ART DOCUMENTS

Patent Documents

Patent Document 1: Japanese Patent Application Laid-Open No. 2008-226941
Patent Document 2: Japanese Patent Application Laid-Open No. 2000-216042
Patent Document 3: Korean Patent Application Laid-Open No. 10-2006-0135249

Patent Document 4: Japanese Patent Application Laid-Open No. 2006-165259

DISCLOSURE OF THE INVENTION

Problem to be Solved by the Invention

Therefore, an object of the present invention is to provide a laminated ceramic electronic component which reduces the problems described above, and a method for manufacturing the laminated ceramic electronic component.

Means for Solving the Problem

The present invention is first directed to a laminated ceramic electronic component including: a laminated body including a plurality of ceramic layers stacked and internal electrodes formed along specific interfaces between the ceramic layers; and an external electrode formed on an outer surface of the laminated body so as to be electrically connected to specific ones of the internal electrodes, and is characterized by the following in order to solve the above-mentioned problems.

The laminated body is divided into a large grain region in which a ceramic constituting the ceramic layers has a relatively large grain diameter and a small grain region in which the ceramic has a relatively small grain diameter, the large grain region is located outside the small grain region, and a boundary surface between the large grain region and the small grain region is located inside the outer surface of the laminated body while surrounding a section in which the internal electrodes are present in the laminated body. It is to be noted that it does not matter whether or not the boundary surface is located in a connecting section between the external electrode and the internal electrodes in the laminated body.

In a more specific aspect of the laminated ceramic electronic component according to the present invention, the laminated body has a rectangular parallelepiped shape including a LW surface defined by a length-direction dimension L and a width-direction dimension W of the laminated body, a LT surface defined by the length-direction dimension L and a thickness-direction dimension T of the laminated body, and a WT surface defined by the width-direction dimension W and the thickness-direction dimension T of the laminated body, and the external electrode is formed on the WT surface. In this case, the boundary surface between the large grain region and the small grain region is located outside a section in which the internal electrodes are present in the laminated body, and inside the outer surface of the laminated body so as to extend continuously along at least the LW surface and the LT surface. In this case, it does not matter whether or not the boundary surface extends along the WT surface.

In the laminated ceramic electronic component according to the present invention, the $D_{80}$ value in a grain diameter distribution of the ceramic in the large grain region is more preferably 5 or more times as large as the $D_{80}$ value in a grain diameter distribution of the ceramic in the small grain region.

The present invention is also directed to a method for manufacturing a laminated ceramic electronic component, the method including the steps of: preparing a raw laminated body including a plurality of ceramic layers stacked and internal electrodes formed along specific interfaces between the ceramic layers; and firing for sintering the raw laminated body. In order to solve the above-mentioned problems, the method for manufacturing a laminated ceramic electronic component according to the present invention is characterized by carrying out a step of carrying out a heat treatment in accordance with a temperature profile in which an average rate of temperature increase from room temperature to a maximum temperature is 40° C./second or more in the firing step.

The heat treatment is preferably carried out in accordance with a temperature profile in which the average rate of temperature increase from the room temperature to the maximum temperature is 100° C./second or more.

It is preferable to further include a step of degreasing the raw laminated body before the step of carrying out the heat treatment.

It is preferable that, even when the internal electrodes contain a base metal as a conductive constituent, the step of carrying out the heat treatment be carried out in an atmosphere with an oxidizing atmosphere gas supplied thereto with respect to the balance oxygen partial pressure of the base metal.

It is preferable that, after reaching the maximum temperature, cooling be carried out without holding the temperature at that treatment.

Advantageous Effect of the Invention

The laminated ceramic electronic component according to the present invention can maintain DC bias characteristics in a favorable manner even when the ceramic layers are reduced in thickness. In particular, in the case of applying the present invention to a laminated ceramic capacitor, the rate of decrease in capacitance due to the application of a direct-current voltage can be kept low, and a relatively high dielectric constant can be obtained in the ceramic layers. These effects are presumed to be produced in accordance with the following mechanism.

The large grain region located outside the boundary surface is considered to have more $BaTiO_3$ based ferroelectricity, as compared with the small grain region located inside the boundary surface. For this reason, it is presumed that when the phase transition is caused from a high temperature phase (paraelectric phase) to a room temperature phase (ferroelectric phase) during the cooling after the firing, the c-axis direction of crystals in the region outside the boundary surface is likely to be oriented in a direction perpendicular to the surface of the laminated body, and stress perpendicular to the surface will be thus caused toward the inside of the laminated body.

In this case, it is presumed that stress creating in-plane direction shrinkage is applied in the ceramic layers inside the boundary surface, and it is presumed that stress is created for the c-axis direction of the crystals and be oriented in a direction parallel to the stacking direction.

In this state, when a direct-current voltage is applied to the laminated ceramic electronic component, the direct-current voltage makes the direction of the electric field intensity and the c-axis direction of the crystals parallel to each other in many cases, and it is thus presumed that the dielectric constant is not substantially decreased even when an electric field is applied to the ceramic layers.

Further, when the section in which the internal electrodes are present is covered only partially with the boundary surface (for example, when the boundary surface is formed only inside the LT surface or only inside the LW surface), it is presumed that the stress is dispersed as a result of phenomenon described above. Therefore, in this case, the object of the present invention is not achieved sufficiently.

In addition, the insufficient formation of the boundary surface causes no problem in the vicinity of the external electrode formed (for example, inside the WT surface). This is presumed to be because the external electrode prevents the stress from being dispersed.

The method for manufacturing a laminated ceramic electronic component according to the present invention can advantageously achieve the characteristic grain diameter distribution as described above in the laminated body.

In addition, the method for manufacturing a laminated ceramic electronic component according to the present invention prevents changes such as electrode breakage and ball formation in the internal electrodes during the heat treatment, and the reduction in the layer thickness of the internal electrodes and the increased coverage can be achieved. In a conventional heat treatment method, for example, it is extremely difficult to achieve an electrode thickness of 0.3 µm or less and a coverage of 80% or more for the internal electrodes in the case of a laminated ceramic capacitor including internal electrodes containing Ni as a conductive constituent. However, the manufacturing method according to the present invention can achieve an electrode thickness of 0.2 µm or less and a coverage of 80% or more by adopting a rate of temperature increase of 40° C./second or more. Furthermore, the rate of temperature increase of 100° C./second can achieve the coverage of 80% or more with the electrode thickness of 0.1 µm or less.

The electrode breakage and ball formation during the heat treatment are more significantly caused in the case of there being a large gap at the interfaces caused by mismatch in the timing of shrinkage between the ceramic layers and the internal electrodes, or in the case of the large total amount of heat energy imparted. Therefore, the period of time when shrinkage is caused during the heat treatment can be reduced significantly from the conventional 40 to 10 minutes to 120 to 5 seconds in accordance with the manufacturing method according to the present invention, and the gap at the interfaces between the ceramic layers and the internal electrodes can be thus prevented. In addition, cooling immediately after achieving the maximum temperature without holding the temperature there can reduce the total amount of heat energy, which is more effective for the prevention of electrode breakage and ball formation.

Since the reduction in the layer thickness of the internal electrodes and the increased coverage are produced as a result of the suppression of shrinkage of the internal electrodes, voids, gaps and the like at the ends of the internal electrodes can also be prevented at the same time. Therefore, sealing of the laminated body after the heat treatment is improved, and the environment resistance reliability as a laminated ceramic electronic component can also be improved accordingly.

In addition, since the shrinkage of the internal electrodes is suppressed as described above, the degree of recess is very small at the ends of the internal electrodes when the internal electrodes are extracted to a predetermined surface of the laminated body. In addition, since the sintering is completed in a short period of time as described above, the additive constituents of the ceramic constituting the ceramic layers cause almost no movement to or segregation onto the surface of a glass phase. Therefore, during formation of the external electrode electrically connected to the internal electrodes, it is possible to omit the step for exposing the extracted ends of the internal electrodes in the formation of the external electrodes.

Since the sintering is completed in a short period of time, additive elements in the ceramic constituting the ceramic layers can be made uniform without segregation of the additive elements. Therefore, the properties provided by the ceramic layers can be stabilized. Furthermore, even in the case of a relatively small additive amount, the effects of the additive elements can be produced sufficiently.

Also, when the ceramic constituting the ceramic layers contains volatile constituents such as Li, B, and Pb (e.g., sintering aids), the volatile constituents are better prevented from scattering during the heat treatment, since the sintering is completed in a short period of time. As a result, the residual amount of the volatile constituents can be prevented from varying due to changes in the size of the laminated body or the charge amount to the firing furnace.

When a laminated ceramic electronic component including internal electrodes containing a base metal such as Ni as a conductive constituent, it is conventionally necessary to precisely control the oxygen partial pressure in the atmosphere around the balance oxygen partial pressure of the base metal in the heat treatment step, in order to achieve a balance between the prevention of oxidation of the internal electrodes and the prevention of reduction of the ceramic, thereby complicating the design of the firing furnace. In contrast, the present invention, the rate of temperature increase is higher in the heat treatment step, and the heat treatment (sintering shrinkage of the ceramic) involves a short period of time of 120 to 5 seconds. Thus, even in a more oxidizing atmosphere than the balance oxygen partial pressure of the base metal, the heat treatment can be carried out almost without oxidizing the internal electrodes. The heat treatment can be carried out under a high oxygen partial pressure, such as, for example, of 100 ppm (about 3.7 more oxidizing than the balance oxygen partial pressure/1300° C.) at a rate of temperature increase of 40° C./second, and 1000 ppm (about 4.7 more oxidizing than the balance oxygen partial pressure/1300° C.) at a rate of temperature increase of 100° C./second. Therefore, the laminated ceramic electronic component can be manufactured with high reliability, with ceramic less likely to be reduced, and without the need for a reoxidation treatment.

BRIEF EXPLANATION OF DRAWINGS

FIG. 1 is a cross-sectional view schematically illustrating a laminated ceramic capacitor as an example of a laminated ceramic electronic component manufactured in accordance with a manufacturing method according to an embodiment of the present invention.

FIG. 2 is a diagram for explaining a grain diameter distribution of a ceramic achieved in a laminated body provided in a laminated ceramic electronic component according to the present invention, where FIG. 2A shows a cross-sectional view along a plane parallel to a LW surface defined by a length-direction dimension L and a width-direction dimension W of the laminated body, FIG. 2B shows a cross-sectional view along a plane parallel to a LT surface defined by the length-direction dimension L and a thickness-direction dimension T of the laminated body, and FIG. 2C shows a cross-sectional view along a plane parallel to a WT surface defined by the width-direction dimension W and the thickness-direction dimension T of the laminated body.

FIG. 12 is a diagram showing a SEM image obtained by imaging a section of a laminated body of a laminated ceramic capacitor prepared in an experiment carried out in accordance with the present invention.

MODE FOR CARRYING OUT THE INVENTION

Figure 3:
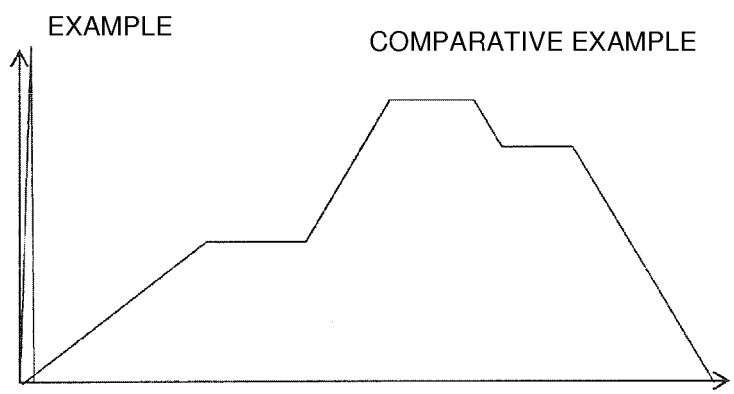
FIG. 3 is a diagram illustrating a temperature profile in a heat treatment step according to an example of the present invention, along with a temperature profile according to a comparative example.

With reference to FIG. 1, the structure of a laminated ceramic capacitor 1 will be described as an example of a laminated ceramic electronic component to which the present invention is applied.

The laminated ceramic capacitor 1 includes a laminated body 2 as a component main body. The laminated body 2 includes a plurality of stacked ceramic layers 3 and a plurality of internal electrodes 4 and 5 formed along the specific interfaces between the ceramic layers 3. The respective ends of the plurality of internal electrodes 4 and 5 are exposed respectively at one and the other end surfaces 6 and 7 of the laminated body 2, and external electrodes 8 and 9 are formed respectively so as to electrically connect the respective ends of the internal electrodes 4 to each other and the respective ends of the internal electrodes 5 to each other.

For manufacturing this laminated ceramic capacitor 1, a raw laminated body for the laminated body 2 is manufactured in accordance with the well known method of stacking ceramic green sheets with the internal electrodes 4 and 5 printed thereon. Then, in order to sinter the raw laminated body, a firing step is carried out. Next, the external electrodes 8 and 9 are formed respectively on the end surfaces 6 and 7 of the laminated body 2 sintered, thereby completing the laminated ceramic capacitor 1.

In the firing step described above, a heat treatment is carried out in which a temperature profile with an average rate of temperature increase of 40° C./second or more from room temperature to the maximum temperature is applied, in the present invention. Preferably, the temperature profile is set to 100° C./second or more.

In addition, the raw laminated body is preferably subjected to a degreasing treatment before the heat treatment step described above.

When the internal electrodes 4 and 5 contain a base metal such as Ni as a conductive constituent, the heat treatment step may be carried out in an atmosphere with an oxidizing atmosphere gas supplied thereto with respect to the balance oxygen partial pressure of the base metal.

After reaching the maximum temperature described above, immediate cooling is preferably carried out without holding the temperature.

The reason why these preferable conditions are employed will be clarified in experimental examples described later.

When the firing step described above is adopted, a ceramic grain diameter distribution described below with reference to FIG. 2 is achieved in a laminated body of a laminated ceramic electronic component obtained.

FIG. 2A shows a cross-sectional view along a plane parallel to a LW surface defined by a length-direction dimension L and a width-direction dimension W of a laminated body 12, FIG. 2B shows a cross-sectional view along a plane parallel to a LT surface defined by the length-direction dimension L and a thickness-direction dimension T of the laminated body 12, and FIG. 2C shows a cross-sectional view along a plane parallel to a WT surface defined by the width-direction dimension W and the thickness-direction dimension T of the laminated body 12. The laminated body 12 has a rectangular parallelepiped shape with the LW surface, the LT surface, and the WT surface.

The laminated body 12 includes, not shown in FIGS. 2A-2C, a plurality of stacked ceramic layers and internal electrodes formed along the specific interfaces between the ceramic layers. In addition, not shown are the external electrodes on the outer surface of the laminated body 12 so as to be electrically connected to the specific internal electrodes.

The ceramic layers, the internal electrodes, and the external electrodes correspond to the ceramic layers 3, the internal electrodes 4 and 5, and the external electrodes 8 and 9, respectively. The respective planar directions of the ceramic layers and internal electrodes are parallel to, for example, the LW surface, and the external electrodes are formed on the WT surface.

As shown in FIGS. 2A-2C, the laminated body 12 is divided into a large grain region 13 in which the ceramic constituting the ceramic layers has a relatively large grain diameter and a small grain region 14 in which the ceramic has a relatively small grain diameter. In this case, the $D_{80}$ value in the grain diameter distribution of the ceramic in the large grain region 13 is preferably 5 or more times larger than the $D_{80}$ value in the grain diameter distribution of the ceramic in the small grain region 14.

The large grain region 13 is located outside the small grain region 14. A boundary surface 15 between the large grain region 13 and the small grain region 14 is located outside an element section 16 of the laminated body 12 in which the internal electrodes are present, and inside the outer surface of the laminated body 12. As described previously, when the external electrodes are formed on the WT surface, the boundary surface 15 preferably extends continuously along at least the LW surface and the LT surface.

In other words, the LW surface and LT surface at the outer surface of the laminated body 12 are located in the large grain region 13, and the boundary surface 15 is present inside each of the LW surface and LT surface. More specifically, the boundary surface 15 is present somewhere in the outer layer section corresponding to the both ends in the stacking direction, and the boundary surface 15 is present somewhere in the side gap section formed on either side of the internal electrodes.

Since the internal electrodes are extracted to the WT surface where the external electrodes are formed, the action of the boundary surface at the WT surface is smaller than the action of the boundary surface 15 at the LW surface and the LT surface. Therefore, it does not matter whether or not the boundary surface 15 is formed along the WT surface.

When the present invention is directed to the manufacture of the laminated ceramic capacitor 1 shown in FIG. 1, the ceramic layers 3 are composed of a dielectric ceramic. However, the present invention may be applied to not only laminated ceramic capacitors, but also other inductors, thermistors, piezoelectric components and the like. Therefore, depending on the function of the laminated ceramic electronic component, the ceramic layers may be composed of, in addition to dielectric ceramics, magnetic ceramics, semiconductor ceramics, piezoelectric ceramics and the like.

While the laminated ceramic capacitor 1 shown in FIG. 1 is a two-terminal type capacitor including the two external terminals 8 and 9, the present invention can also be applied to multi-terminal type laminated ceramic electronic components.

In addition, the present invention is not limited to laminated ceramic electronic components including a laminated body in the shape of a rectangular parallelepiped, and can also be applied to laminated ceramic electronic components including a laminated body in a shape other than the rectangular parallelepiped shape.

Experimental examples will be described below in which laminated ceramic capacitors as samples were manufactured according to each of an example within the scope of the present invention and a comparative example outside the scope, and evaluated.

1. Experimental Example 1

Comparison Between Example and Comparative Example Under Typical Heat Treatment Condition Raw laminated bodies for laminated ceramic capacitors, including internal electrodes containing Ni as a conductive constituent and ceramic layers containing $BaTiO_3$ as a main constituent, were subjected to a degreasing treatment until the amount of residual carbon reached about 1000 weight ppm, and then subjected to a heat treatment under the heat treatment conditions as shown in Table 1, thereby providing sintered laminated bodies according to each of the example and comparative example.

TABLE 1

|  | Comparative Example | Example |
| --- | --- | --- |
| Rate of Temperature Increase | 0.17° C./second | 40° C./second |
| Maximum Temperature | 1200° C. | 1300° C. |
| Holding Time | 7200 seconds | 0 seconds |
| Firing Time | 4 hours | 33 seconds |
| Atmosphere | $N_2/H_2/H_2O$ | $N_2$ |
| In furnace $PO_2$ (at Maximum Temperature) | $PO_2: 10^{-10.5}$ MPa | $PO_2: 10^{-4.6}$ MPa |

In Table 1, the term "Rate of Temperature Increase" indicates an average rate of temperature increase from room temperature to the maximum temperature. FIG. 3 shows the respective temperature profiles for facilitating the relative comparison between the example and the comparative example.

The results of evaluating the samples of the laminated bodies sintered by the heat treatment described above according to each of the example and the comparative example are shown in FIGS. 4 through 8.

Figure 4:
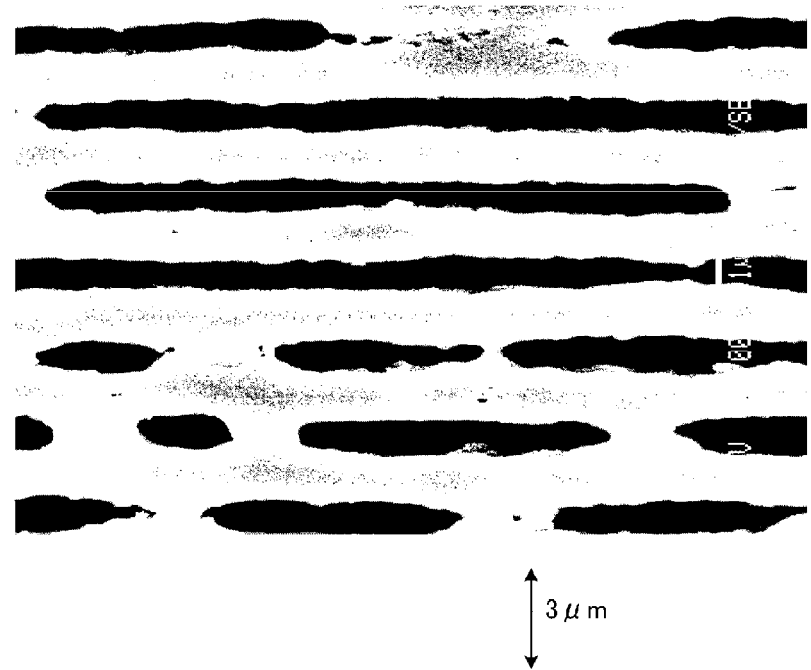
FIG. 4 is SEM observation images showing cross sections in the thickness direction of internal electrodes in central sections of laminated bodies included in laminated ceramic capacitors obtained according to each of an example of the present invention and a comparative example.
Figure 4:
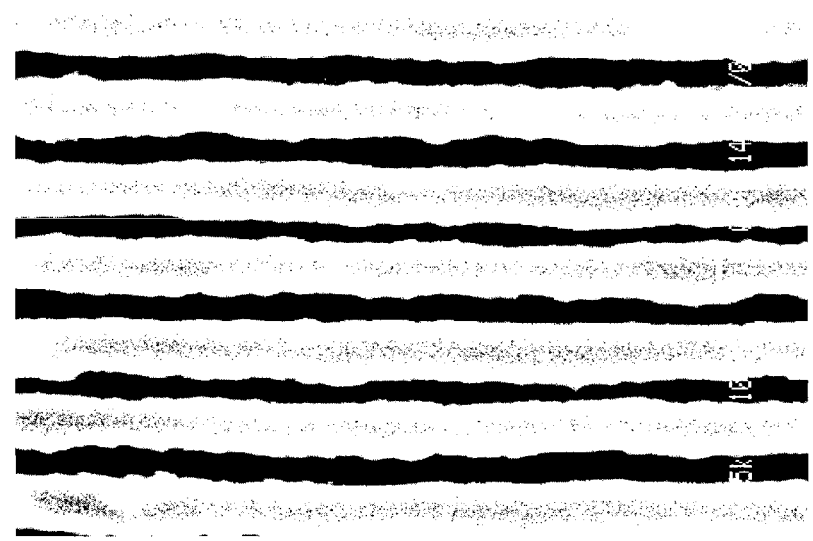

FIG. 4 shows cross sections in the thickness direction of the internal electrodes in central sections of the laminated bodies. The relatively darker regions refer to the internal electrodes. From FIG. 4, it is determined that the reduction in layer thickness of the example is achieved while ensuring the continuity of the internal electrodes, as compared with the comparative example.

Figure 5:
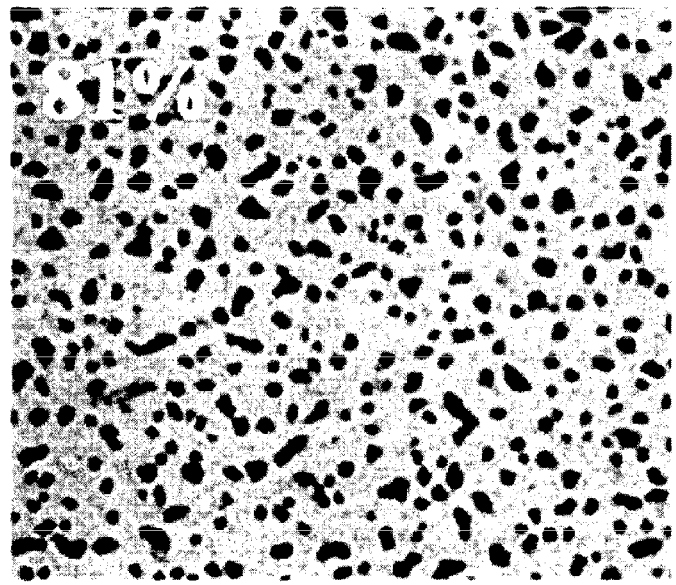
FIG. 5 is optical micrographs showing surface states of the internal electrodes in central sections of the laminated bodies included in the laminated ceramic capacitors obtained according to each of the example of the present invention and the comparative example.
Figure 5:
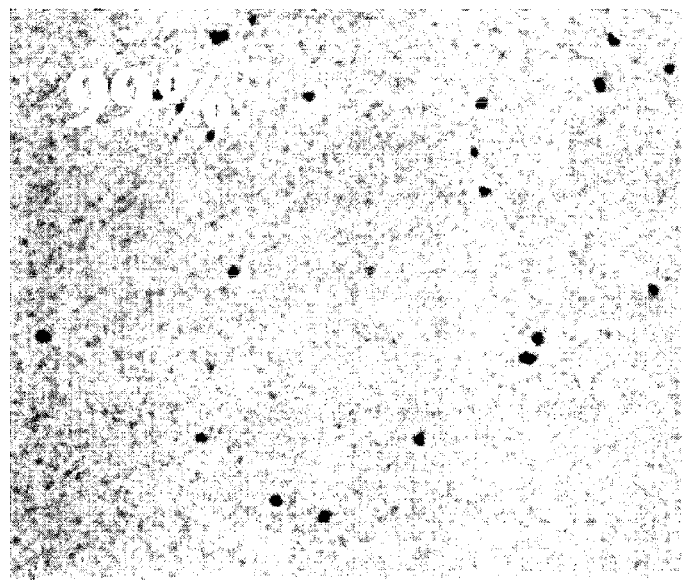

FIG. 5 shows surface states of the internal electrodes in central sections of the laminated bodies. The relatively darker spots refer to deficient sections of the internal electrodes. From FIG. 5, it is determined that there is achievement of an increased coverage is made for the internal electrodes in the example, as compared with the comparative example.

Figure 6:
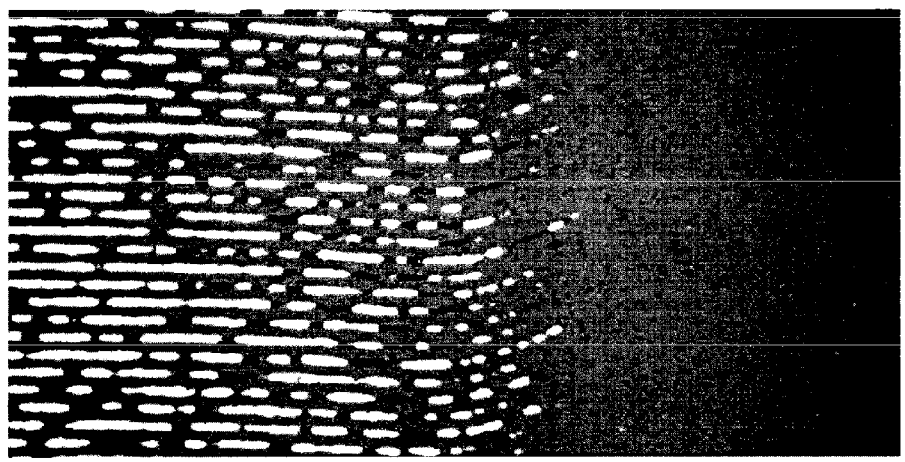
FIG. 6 is optical micrographs showing cross sections in the thickness direction at the ends of the internal electrodes included in the laminated ceramic capacitors obtained according to each of the example of the present invention and the comparative example.
Figure 6:
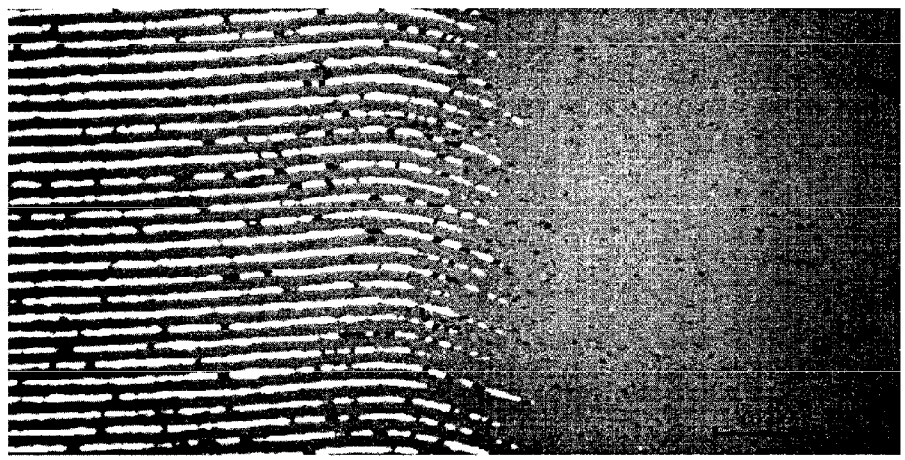

FIG. 6 shows cross sections in the thickness direction at the ends of the internal electrodes. The relatively paler regions refer to the internal electrodes. From FIG. 6, it is determined that in the example, voids or gaps are prevented from being caused at the ends of the internal electrodes, as compared with the comparative example.

From the evaluation results shown in FIGS. 4 through 6, it is determined that a high sealing property is obtained in the laminated body in the example, and the environment resistance reliability of the laminated ceramic capacitor can be thus improved. While sealing for the improvement of the environment resistance reliability has been conventionally required for the external electrodes, a high sealing property is obtained in the laminated body according to the example, and it is thus enough for the external electrodes to achieve the electrical connection with the internal electrodes. Therefore, the advantage can be also expected that material option and process design can be facilitated for the formation of the external electrodes.

Figure 7:
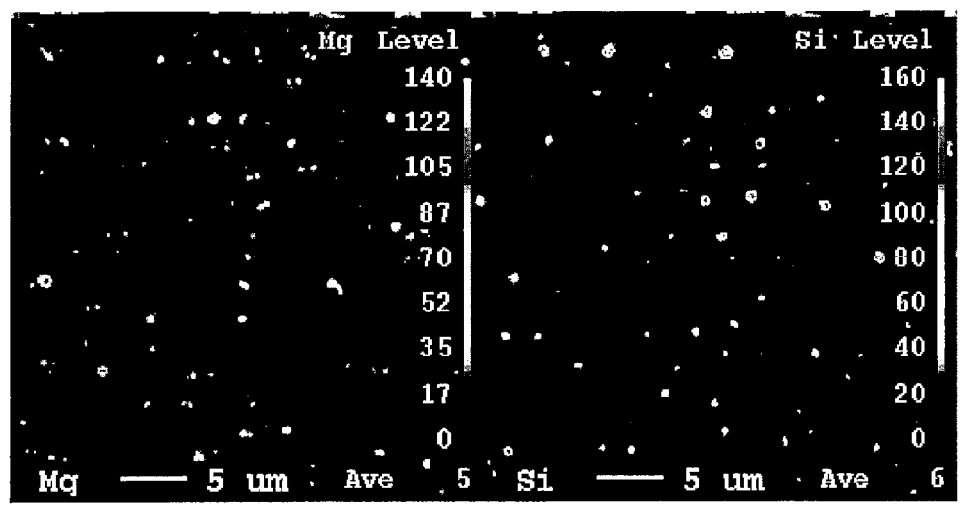
FIG. 7 is WDX mapping images of ceramic layers in central sections of the laminated bodies included in the laminated ceramic capacitors obtained according to each of the example of the present invention and the comparative example, which show segregation states of heterophases (Mg and Si).
Figure 7:
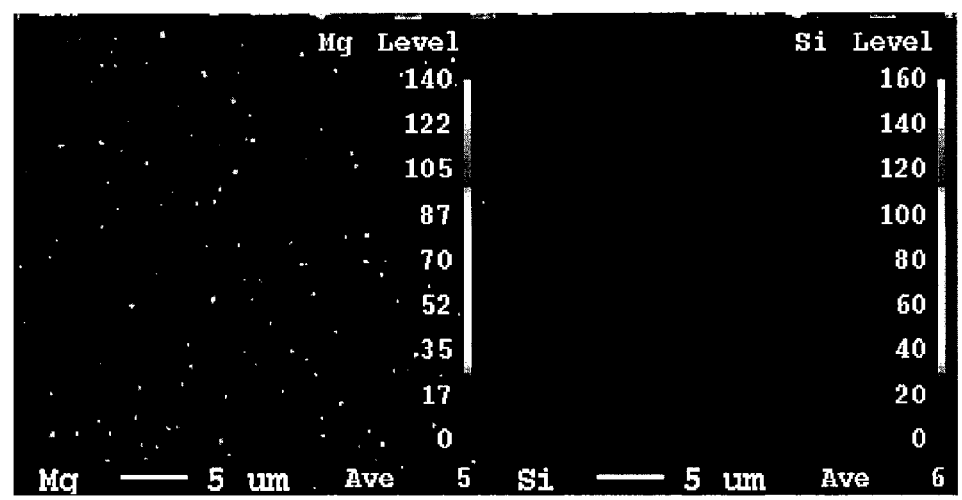

FIG. 7 shows WDX mapping images of the ceramic layers in central sections of the laminated bodies, and the segregation states of heterophases (Mg and Si) are shown particularly. These heterophases are indicated by relatively light spots in FIG. 7. The additive elements (Mg, Si, etc.) to the ceramic constituting the ceramic layers are likely to be segregated after the heat treatment, and these segregated heterophases adversely affect the reliability of the ceramic layers in many cases. As is obvious from FIG. 7, the segregation of the additive elements is much less likely to be caused in the example, as compared with the comparative example. Therefore, it is determined that the characteristics are stabilized by the invention.

Figure 8:
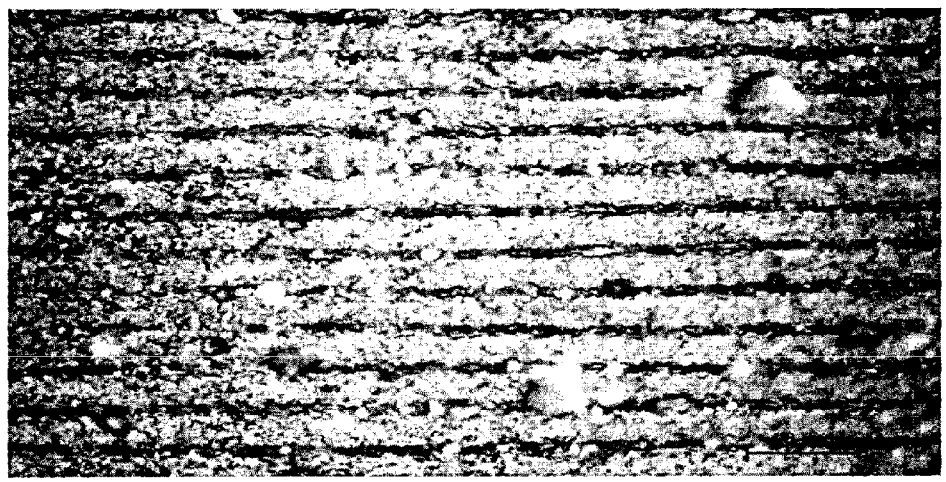
FIG. 8 is optical micrographs showing extracted sections of the internal electrodes in the laminated bodies included in the laminated ceramic capacitors obtained according to each of the example of the present invention and the comparative example.
Figure 8:
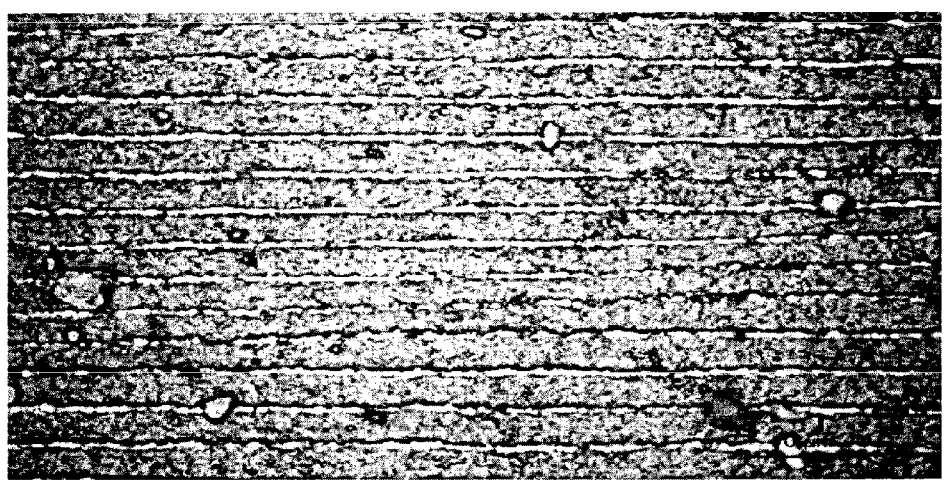

FIG. 8 shows extracted sections of the internal electrodes. As is obvious from FIG. 8, as compared with the comparative example, the example achieves not only the reduction in the layer thickness of the internal electrodes, but also a quite small amount of recess at the extracted sections and a completion of sintering in a short period of time, and thus causes almost no movement to or segregation onto the surface of a glass phase due to the additive constituents. Therefore, it is also possible to omit the step for exposing the extracted ends of the internal electrodes in the formation of the external electrodes.

2. Experimental Example 2

Relationship Between Rate of Temperature Increase and Electrode Thickness

As shown in Table 2 below, the rate of temperature increase was changed variously to obtain the minimum electrode thickness with which a coverage of 80% or more was obtained in the external electrodes. It is to be noted that two types of samples, electrodes using Ni foil (Ni foil electrodes) and electrodes using a conductive paste containing a Ni spherical powder (Ni spherical electrodes) were prepared as the internal electrodes in Experimental Example 2. A powder with a relatively low filling rate on the order of 40 to 50% was used for the conductive paste containing the Ni spherical powder.

TABLE 2

| Conditions | Rate of Temperature Increase (° C./second) | Electrode Thickness with Coverage of 80% or more (μm) | |
|---|---|---|---|
| | | Ni Foil Electrode | Ni Spherical Electrode |
| 1 | 270 | 0.10 | 0.25 |
| 2 | 160 | 0.12 | 0.25 |
| 3 | 40 | 0.13 | 0.25 |
| 4 | 15 | 0.30 | 0.45 |
| 5 | 1.67 | 0.35 | 0.55 |
| 6 | 0.17 | 0.50 | 0.80 |

Figure 9:
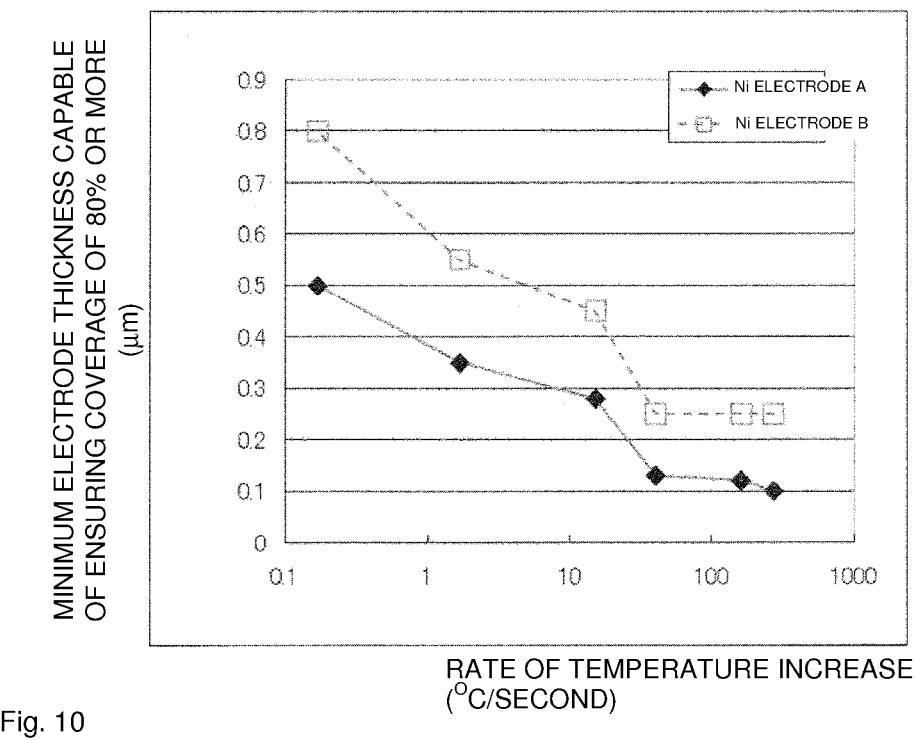
FIG. 9 is a diagram showing the relationship between a rate of temperature increase and a minimum electrode thickness which is capable of ensuring a coverage of 80% or more, which was obtained in an experiment carried out in accordance with the present invention.

The relationship between the rate of temperature increase and the electrode thickness shown in Table 2 is also shown in FIG. 9. In FIG. 9, the term "Ni ELECTRODE A" refers to the Ni foil electrode, whereas the term "Ni ELECTRODE B" refers to the Ni spherical electrode.

The reduction in the layer thickness of the internal electrodes is affected by the gaps at the interfaces between the ceramic layers and the internal electrodes. As shown in Table 2 and FIG. 9, it is not possible to maintain the binding force to the internal electrodes with an electrode thickness of 0.3 μm or less at a rate of temperature increase of 15° C./second or less, and it is thus difficult to ensure a coverage of 80% or more. In contrast, a rate of temperature increase of 40° C./second or more causes sintering shrinkage of the ceramic in a short period of time, and thus allows the coverage of 80% or more to be ensured even with the electrode thickness of 0.3 μm or less. Furthermore, the rate of temperature increase of 100° C./second or more allows the coverage of 80% or more to be ensured even with an electrode thickness of 0.1 μm or less.

It is to be noted that the standards for the electrode thickness as described above vary depending on the filling rate of the conductive paste used in the case of the Ni spherical electrodes using the conductive paste. In the case of the conductive paste with the relatively low filling rate, which was used in this experimental example, the electrode thickness has to be relatively increased in order to ensure and obtain the predetermined coverage.

While using Ni as the conductive constituent of the internal electrodes has been described in this experimental example, a similar tendency will be indicated in the case of, for example, Cu, Ag, Pt, Pd, Al, Ti, Cr, or an alloy thereof.

3. Experimental Example 3

Relationship Between Rate of Temperature Increase and Amount of Residual Volatile Constituent When the ceramic constituting the ceramic layers contains volatile constituents such as Li, B, and Pb, the residual amount of these volatile constituents after the heat treatment is empirically known to vary depending on the size of the laminated body and the amount of the laminated body charged to the firing furnace during the heat treatment. Therefore, this variation leads to problems such as impaired stability of characteristics in practical use. However, in the present invention, the increased rate of temperature increase can reduce the sintering shrinkage time of the ceramic, and thus, can significantly suppress the variation in the residual amount of the volatile constituents.

Table 3 below shows the effect of the rate of temperature increase on the residual percentage (=residual amount/additive amount) of the volatile constituents. More specifically, Table 3 shows the relationship between the residual percentage of the volatile constituents and the rate of temperature increase, which was evaluated for the case of 0.6 mm×0.3 mm (0603 size) and the case of 3.2 mm×2.5 mm (3225 size) in terms of the planar size of the laminated body, and shows the difference in the residual percentage of the volatile constituents between the "0603 size" and the "3225 size" as "Variation in Residual Percentage".

TABLE 3

| Rate of Temperature Increase (° C./second) | Residual Percentage of Volatile Constituents (%) | | Variation in Residual Percentage (%) |
|---|---|---|---|
| | 0603 Size | 3225 Size | |
| 270 | 99.7 | 99.9 | 0.2 |
| 160 | 99.7 | 99.9 | 0.2 |
| 40.0 | 99.1 | 99.6 | 0.5 |
| 15.0 | 95.4 | 98.8 | 3.4 |
| 1.67 | 71.3 | 91.4 | 19.9 |
| 0.17 | 0.5 | 61.3 | 60.8 |

From Table 3, it is determined that the variation in residual percentage due to the size of the laminated body can be reduced by increasing the rate of temperature increase, and in particular, a rate of temperature increase of 40° C./second or more can suppress the variation in residual percentage to 1% or less.

The tendency described is also likewise indicated in the case of changing the amount of the laminated body during the heat treatment.

4. Experimental Example 4

Figure 10:
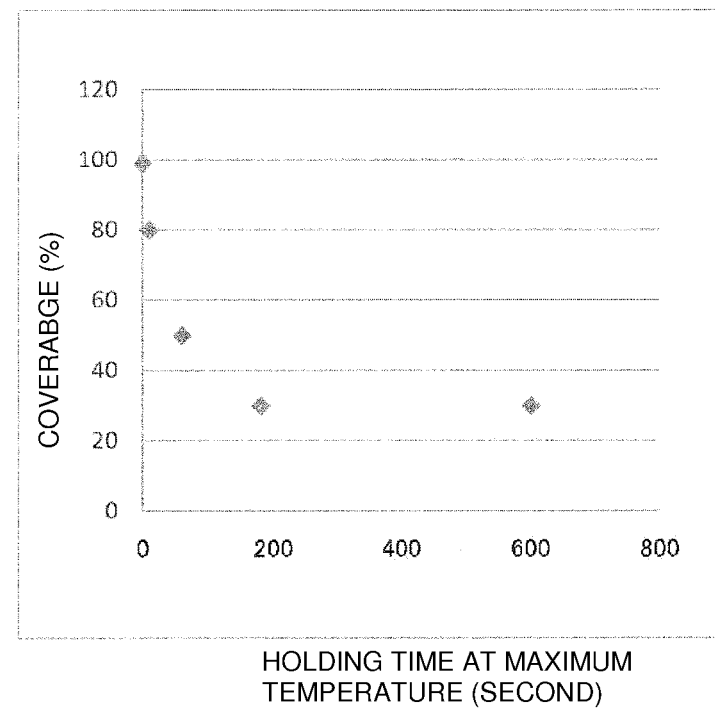
FIG. 10 is a diagram showing the relationship between a holding time at a maximum temperature and an electrode coverage, which was obtained in an experiment carried out in accordance with the present invention.

Relationship Between Holding Temperature at Maximum Temperature and Electrode Coverage While the reduction in the layer thickness of the internal electrodes and the increased coverage can be achieved according to the present invention as described above, these reduction and coverage are also affected by the holding time at the maximum temperature, in addition to the rate of temperature increase. FIG. 10 shows the relationship between the holding time at 1380° C. and the electrode coverage after reaching 1380° C. at a rate of temperature increase of 40° C./second in order to obtain a laminated body for a laminated ceramic capacitor including Ni internal electrodes with an electrode thickness of 0.3 μm.

As shown in FIG. 10, the increased rate of temperature increase achieves a higher coverage immediately after reaching 1380° C. However, it is determined that holding the maximum temperature of 1380° C. decreases the coverage rapidly (ball formation). This is believed to be because the ceramic has no strength but exhibits softness around the maximum temperature at which shrinkage is completed while the binding force to the internal electrodes can be maintained in the rapid temperature increase, holding the temperature thus causes a driving force which tries to minimize the surface energy of the internal electrodes, leading to the inability to resist ball formation caused by this driving force, and as a result, the coverage will be decreased.

In particular, the driving force is more significant with a decrease in electrode thickness because the ratio of the surface is increased. Therefore, after reaching the maximum temperature, immediate cooling is desirable without holding the temperature at maximum.

5. Experimental Example 5

Figure 11:
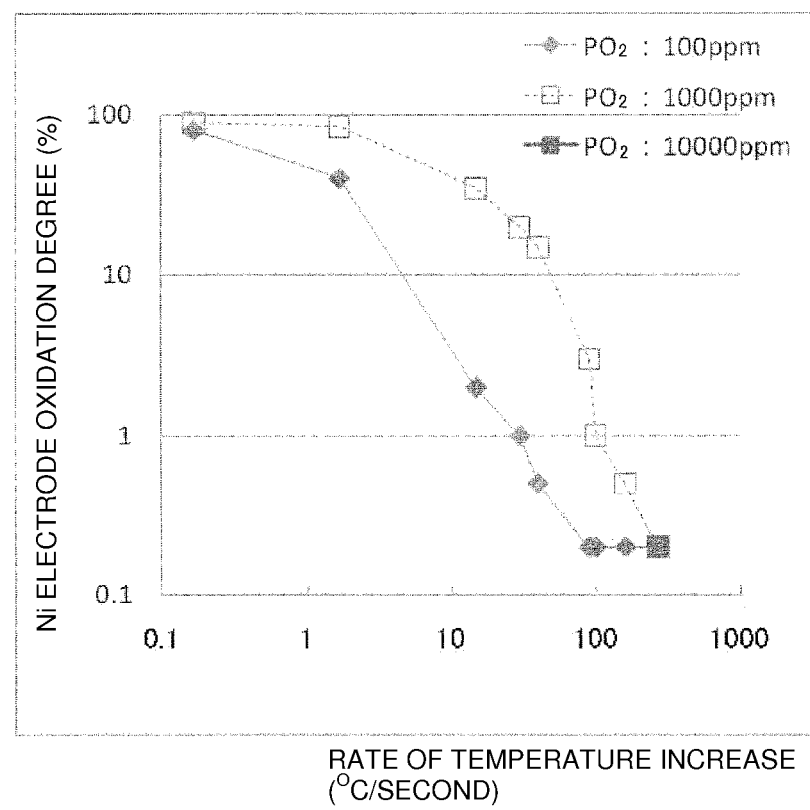
FIG. 11 is a diagram showing the relationship between a rate of temperature increase under a predetermined oxygen partial pressure and the oxidation degree of Ni electrodes, which was obtained in an experiment carried out in accordance with the present invention.

Relationship Between Rate of Temperature Increase and Oxidation Degree of Ni Electrode In Experimental Example 5, three types of atmospheres with oxygen partial pressure ($PO_2$) of 100 ppm, 1000 ppm, and 10000 ppm were adopted in the heat treatment step, as shown in Table 4 and FIG. 11. Table 4 and FIG. 11 show the relationship between an average rate of temperature increase from room temperature to the maximum temperature and the oxidation degree of the Ni electrode under the three oxygen partial pressures of 100 ppm, 1000 ppm, and 10000 ppm. The adjustments of these oxygen partial pressures were made by introducing a predetermined amount of oxygen into a nitrogen atmosphere.

TABLE 4

| Rate of Temperature Increase (° C./second) | $PO_2$: 100 ppm | $PO_2$: 1000 ppm | $PO_2$: 10000 ppm |
|---|---|---|---|
| 270 | 0.2 | 0.2 | 0.2 |
| 160 | 0.2 | 0.5 | — |
| 100 | 0.2 | 1.0 | — |
| 90 | 0.2 | 3.0 | — |
| 40 | 0.5 | 15 | — |
| 30 | 1.0 | 20 | — |
| 15 | 2.0 | 35 | — |
| 1.67 | 40 | 85 | — |
| 0.17 | 80 | 90 | — |

(unit: %)

In the case of Table 4 boxes with no numerical value in the column "$PO_2$: 10000 ppm" in Table 4, no evaluation was carried out. More specifically, an evaluation was carried out only in the case of a rate of temperature increase of 270° C./second under the condition with an oxygen partial pressure of 10000 ppm.

From Table 4 and FIG. 11, it is determined that it is possible to fire a laminated ceramic capacitor including Ni internal electrodes at an electrode oxidation degree of 1% or less when the rate of temperature increase is 40° C./second or more at the oxygen partial pressure of 100 ppm. Furthermore, it is determined that the rate of temperature increase of 100° C./second or more allows for firing at an electrode oxidation degree of 1% or less even at an oxygen partial pressure of 1000 ppm. In addition, it is determined that even in the case of the higher oxygen partial pressure of 10000 ppm, the rate of temperature increase 270° C./second can suppress the electrode oxidation degree to 0.2% in this experimental example.

From these results, it is determined that the increased rate of temperature increase relatively increases the oxygen partial pressure for the firing, and thus suppresses the reduction of the ceramic (generation of oxygen vacancies), thereby producing effects such as an improvement in the reliability of the laminated ceramic capacitor obtained.

6. Experimental Example 6

Effect of Boundary Surface Between Large Grain Region and Small Grain Region In Experimental Example 6, laminated ceramic capacitor samples 1 to 4 in a typical rectangular parallelepiped shape were prepared and evaluated respectively. The samples 1 to 4 are summarized as follows. The sample 1 corresponds to an example within the scope of the present invention, which has a boundary surface inside each of the LW surface and the LT surface. On the other hand, the samples 2 to 4 correspond to comparative examples outside the scope of the present invention. In particular, the sample 2 refers to a sample which has a boundary surface only inside of the LW surface, the sample 3 refers to a sample which has a boundary surface only inside of the LT surface, and the sample 4 refers to a sample which has no boundary surface anywhere.

(1) Preparation of Ceramic Raw Material Powder (Ceramic Raw Material Powder A with Relatively Small Diameter)

A $BaCO_3$ powder and a $TiO_2$ powder were weighed so that the Ba/Ti molar ratio was 1.001, and subjected to wet mixing and grounding in a mill using $ZrO_2$ balls. The slurry obtained by the wet grinding was dried, and then heated to 900° C. or more to prepare a $BaTiO_3$ powder with an average grain diameter of 0.2 μm. To 100 parts by mol of this $BaTiO_3$ powder, 0.5 parts by mol of a $Dy_2O_3$ powder, 1.2 parts by mol of a $MgCO_3$ powder, 0.2 parts by mol of a $MnCO_3$ powder, and 1.0 part by mol of a $BaCO_3$ powder were respectively added, 1.2 parts by mol (in terms of $SiO_2$) of an $SiO_2$ sol was further added, wet mixing and grounding was carried out in a mill using $ZrO_2$ balls, and the slurry obtained by the wet mixing and grinding was then dried to prepare a ceramic raw material powder A.

(Ceramic Raw Material Powder B with Relatively Small Diameter)

A $BaCO_3$ powder and a $TiO_2$ powder were weighed so that the Ba/Ti molar ratio was 1.001, and subjected to wet mixing and grounding in a mill using $ZrO_2$ balls. The slurry obtained by the wet grinding was dried, and then heated to 1000° C. or more to prepare a $BaTiO_3$ powder with an average grain diameter of 0.5 μm. To 100 parts by mol of this $BaTiO_3$ powder, 0.25 parts by mol of a $Dy_2O_3$ powder, 1.2 parts by mol of a $MgCO_3$ powder, 0.2 parts by mol of a $MnCO_3$ powder, and 1.0 part by mol of a $BaCO_3$ powder were respectively added, 1.7 parts by mol in terms of $SiO_2$ of an $SiO_2$ sol was further added, wet mixing and grounding was carried out in a mill using $ZrO_2$ balls, and the slurry obtained by the wet mixing and grinding was then dried to prepare a ceramic raw material powder B.

(2) Preparation of Ceramic Slurry and Ceramic Green Sheets

To the ceramic raw material powder A, a polybutyral based binder and a plasticizer were added, ethyl alcohol was added, wet mixing and grinding was carried out in a $ZrO_2$ ball mill for the formation of a slurry, and ceramic green sheets A with a thickness of 2.8 μm were formed with the use of a gravure coater.

The ceramic raw material powder B was also formed in the same way into ceramic green sheets B with a thickness of 5 μm.

In addition, some of the slurry prepared for the formation of the ceramic green sheets B was sampled, and the solvent was partially removed from the slurry to prepare a thickened ceramic slurry C.

(3) Preparation of Laminated Body

Sample 1

A conductive paste containing nickel as its main constituent was applied by screen printing onto the ceramic green sheets A to form a conductive paste film pattern to serve as internal electrodes. After that, 280 of the ceramic green sheets A with the conductive paste films formed were stacked in such a way that the side to which the conductive paste films reached were alternated, thereby providing an inner layer section, and further, in order to form an outer layer section for sandwiching the inner layer section, the ceramic green sheets A with no conductive paste films were stacked. The outer layer section on one side had a thickness of 145 μm. Next, a dicing saw was applied to the green laminated block A obtained in this way to cut the green laminated block A into a number of green laminated chips A where the side gap section on one side had a thickness of 145 μm.

Sample 2

A conductive paste containing nickel as its main constituent was applied by screen printing onto the ceramic green sheets A to form a conductive paste film pattern to serve as internal electrodes. After that, 280 of the ceramic green sheets A with the conductive paste films formed were stacked in such a way that the sides which the conductive paste films reached were alternated, thereby providing an inner layer section, and further, in order to form an outer layer section for sandwiching the inner layer section, the ceramic green sheets B with no conductive paste films were stacked. The outer layer section on one side had a thickness of 145 μm. Next, a dicing saw was applied to the green laminated block B obtained in this way to cut the green laminated block B into a number of green laminated chips B obtained so that the side gap section on one side had a thickness of 145 μm.

Sample 3

A conductive paste containing nickel as its main constituent was applied by screen printing onto the ceramic green sheets A to form a conductive paste film pattern to serve as internal electrodes. After that, 280 of the ceramic green sheets A with the conductive paste films formed were stacked in such a way that the sides to which the conductive paste films reached were alternated, thereby providing an inner layer section, and further, in order to form an outer layer section for sandwiching the inner layer section, the ceramic green sheets A with no conductive paste films were stacked. The outer layer section on one side had a thickness of 145 μm. Next, a dicing saw was applied to the green laminated block C obtained in this way to cut the green laminated block C so that the side gap section on one side had a thickness of 10 μm. Next, the ceramic slurry C was applied for a predetermined thickness to the surfaces of the thus cut individual pieces to serve LT surfaces, and dried to provide the side gap with a thickness of 145 μm on one side. Cutting was further carried out to obtain green laminated chips C.

Sample 4

The same steps as in the case of the sample 1 were applied to obtain a number of green laminated chips D. Those green laminated chips D have the same properties as those of the green laminated chips A described previously.

(4) Preparation of Laminated Ceramic Capacitors

The green laminated chips A to D prepared as described above were subjected to a heat treatment at 280° C. in a gas flow of $N_2$ to burn and remove the binder. Subsequently, these chips were fired in an atmosphere with an oxygen partial pressure of $10^{9.6}$ MPa in a gas flow of $N_2/H_2/H_2O$.

In this case, as shown in Table 5, the green laminated chip A according to the sample 1 was fired under the heating conditions of 40° C./second for the average rate of temperature increase, 1300° C. for the maximum temperature, and 1 second for the holding time at the maximum temperature.

In addition, the green laminated chips B, C, and D according to each of the samples 2, 3, and 4 were fired under the heating conditions of 0.17° C./second for the average rate of temperature increase, 1220° C. for the maximum temperature, and 1 hour for the holding time at the maximum temperature.

TABLE 5

| Sample Number | Green laminated chips | Average rate of temperature increase | Maximum temperature | Holding time at maximum temperature |
|---|---|---|---|---|
| 1 | A | 40° C./second | 1300° C. | for 1 second |
| 2 | B | 0.17° C./second | 1220° C. | for 1 hour |
| 3 | C | 0.17° C./second | 1220° C. | for 1 hour |
| 4 | D | 0.17° C./second | 1220° C. | for 1 hour |

Next, in order to form external electrodes on the end surface sections to which the internal electrodes were extracted in the laminated chips obtained by firing as described above, a conductive paste containing Cu as its main constituent was applied and fired at a temperature of 800° C. to form a Cu thick film layer, and the Cu thick film layer was subjected to Ni plating and Sn plating.

The laminated ceramic capacitors obtained in this way had dimensions (including the external electrodes) of a length L: 2.0 mm, a width W: 1.2 mm, and a thickness T: 1.2 mm. The dielectric ceramic layers had a thickness of 2.0 μm per layer, and the overlapped section of the internal electrodes had an area of 2.0 $mm^2$. In addition, the outer layer section had a thickness of 120 μm, whereas the side gap section had a thickness of 120 μm.

(5) Evaluation

Observation of a cross section parallel to the LT surface of the laminated body of the laminated ceramic capacitor according to the sample 1 showed a boundary surface with a difference in grain diameter distribution between inside and outside of the boundary surface from each other was observed at a distance of about 45 μm from the outermost internal electrode in the outer layer section. Likewise, according to observation of a cross section parallel to the LW surface of the laminated body, a similar boundary was also observed at a distance of about 45 μm from the side edge of the internal electrode in the side gap section.

FIG. 12 shows a SEM image obtained by imaging a cross section parallel to the LT surface of the laminated body of the laminated ceramic capacitor according to the sample 1. FIG. 12 has an upper end at a distance of 60 μm from the outermost internal electrode, and a lower end at a distance of 25 μm from the outermost internal electrode. In FIG. 12, it is observed that the grain diameter distribution is different between inside and outside the boundary surface.

On the other hand, a boundary surface was observed only in the outer layer section in the case of the sample 2, whereas a boundary surface was observed only in the side gap section of sample 3. In addition, no boundary surface was observed in either the outer layer section or the side gap section in the case of the sample 4.

Next, the laminated ceramic capacitors according to each sample were fractured, and subjected to thermal etching in a gas flow of $N_2/H_2$ under a temperature of 1000° C. for 5 minutes, and SEM photographs of the fracture surfaces taken at 30000-fold magnification were subjected to an image analysis to calculate an area-equivalent circular equivalent diameter for each grain as a grain diameter, thereby obtaining the grain diameters of grains in a region at a distance of 20 to 40 μm from the internal electrode and the grain diameters of grains in a region at a distance of 50 to 70 μm from the internal electrode in each of the outer layer section and the side gap section.

The image analysis was carried out for 50 fields of the SEM photograph with the area per field of 12.5 μm² to obtain the grain diameters. Then, in each field, the grains were arranged in ascending order of grain size, and the grain diameter at which the accumulated total of the area of each grain reached 80% of the entire field was defined as the $D_{80}$ value of the grain diameter distribution in the field.

In each of the outer layer section and the side gap section, the region at the distance of 20 to 40 μm from the internal electrode corresponds to, for example, the region inside the boundary surface in the case of the sample 1, and the maximum value of $D_{80}$ values in this region is indicated as the "Maximum $D_{80}$ Value in Region of 20 to 40 μm" in Table 6. In addition, the region at the distance of 50 to 70 μm from the internal electrode corresponds to, for example, the region outside the boundary surface in the case of the sample 1, and the minimum value of $D_{80}$ values in this region is indicated as the "Minimum $D_{80}$ Value in Region of 50 to 70 μm" in Table 6.

TABLE 6

| | Outer Layer Section | | | Side Gap Section | | |
|---|---|---|---|---|---|---|
| Sample Number | Maximum $D_{80}$ Value in Region of 20 to 40 μm | Minimum $D_{80}$ Value in Region of 50 to 70 μm | Boundary Surface | Maximum $D_{80}$ Value in Region of 20 to 40 μm | Minimum $D_{80}$ Value in Region of 50 to 70 μm | Boundary Surface |
| 1 | 0.3 μm | 1.6 μm | Yes | 0.3 μm | 1.7 μm | Yes |
| 2 | 0.3 μm | 1.6 μm | Yes | 0.3 μm | 0.3 μm | No |
| 3 | 0.3 μm | 0.3 μm | No | 0.3 μm | 1.8 μm | Yes |
| 4 | 0.3 μm | 0.3 μm | No | 0.3 μm | 0.3 μm | No |

Table 6 also shows the presence or absence of the boundary surface described previously.

As shown in Table 6, it should be understood that the "Maximum $D_{80}$ Value in Region of 20 to 40 μm" and "Minimum $D_{80}$ Value in Region of 50 to 70 μm" indicate the same value in the case of the outer layer section or side gap section in the absence of the boundary surface. In contrast, the "Minimum $D_{80}$ Value in Region of 50 to 70 μm" indicate a larger value as compared with the "Maximum $D_{80}$ Value in Region of 20 to 40 μm" in the case of the outer layer section or side gap section in the presence of the boundary surface, and the former "Minimum $D_{80}$ Value in Region of 50 to 70 μm" indicates a 5 or more times larger value as the latter "Maximum $D_{80}$ Value in Region of 20 to 40 μm".

For the laminated ceramic capacitors according to each sample, the capacitance ($C_{DC0V}$) in the case of applying no direct-current voltage was measured with the use of an automatic bridge measuring instrument at a temperature of 25° C. under the conditions of 120 Hz and 10 V.

Next, in the same manner, the capacitance at a direct-current voltage applied was obtained as a capacitance ($\in_{DC0V}$) applying a direct-current voltage of 4 V for one second.

It is to be noted that 24 hours before the measurement of the capacitance, the samples of the laminated ceramic capacitors for the measurement were heated at a temperature of 150° C. for 1 hour, and stored under a temperature of 25° C. without the application of any voltage after the heating until the measurement.

From the capacitances ($C_{DC0V}$ and $C_{DC4V}$) measured in accordance with the method described above, the thickness of the dielectric ceramic layer, the area of the overlap of the internal electrodes, and the number of stacked layers, as shown in Table 7, the reference dielectric constant ($\in_{DC0V}$) in the case of applying no direct-current voltage and the dielectric constant ($\in_{DC4V}$) at a direct-current voltage were obtained in the ceramic capacitors according to each sample, and from the reference dielectric constant ($\in_{DC0V}$) and the dielectric constant ($\in_{DC4V}$) at a direct-current voltage, the rate of change in the dielectric constant ($\in_{DC4V}$) at a direct-current voltage with respect to the reference dielectric constant ($\in_{DC0V}$), that is, the rate of change in dielectric constant ($\Delta\in$) [%] was calculated in accordance with the equation of $\Delta\in=\{(\in_{DC4V}-\in_{DC0V})/\in_{DC0V}\}\times100$.

TABLE 7

| Sample Number | Reference Dielectric Constant $\in_{DC0V}$ | Dielectric Constant at Direct-Current Voltage $\in_{DC4V}$ | Rate of Change in Dielectric Constant $\Delta\in$ |
|---|---|---|---|
| 1 | 3240 | 2710 | −16.4 |
| 2 | 3050 | 2430 | −20.3 |
| 3 | 2980 | 2400 | −19.5 |
| 4 | 3020 | 2420 | −19.9 |

As is obvious from Table 7, the sample 1 exhibited the highest dielectric constant. Furthermore, the sample 1 has a less significantly decreased dielectric constant ($\in_{DC4V}$) at the direct-current voltage and has a smaller rate of change in dielectric constant ($\Delta\in$) as compared with the other samples 2 to 4, in spite of its high reference dielectric constant ($\in_{DC0V}$).

The consideration of the results shown in Table 7 along with the results shown in Table 6 reveals the following.

As shown in Table 7, the sample 1 has the smaller rate of change in dielectric constant ($\Delta\in$). Table 6 shows that sample 1 has the boundary surface in both the outer layer section and the side gap section, and exhibits a larger value for the "Minimum $D_{80}$ Value in Region of 50 to 70 μm" as compared with the "Maximum $D_{80}$ Value in Region of 20 to 40 μm". Thus, it is determined that the DC bias characteristics can be maintained in a favorable manner even with a reduction in the thickness of the ceramic layers, when the large grain region is located outside the small grain region, and when the boundary surface between the large grain region and the grain region is located outside the section in which the internal electrodes are present and inside the outer surface of the laminated body so as to extend along the outer layer section and the side gap section, as in the sample 1.

Furthermore, it is determined that, in order to advantageously achieve the characteristic grain diameter distribution of the sample 1 as described above, it is effective to carry out a heat treatment in accordance with a temperature profile in which the average rate of temperature increase is 40° C./second or more from room temperature to the maximum temperature in a firing step.

In contrast, it is determined that the rate of change in dielectric constant is increased to degrade the DC bias characteristics when the section in which the internal electrodes are present is covered only partially with the boundary surface, that is, when the boundary surface is present only in the outer layer section as in the sample 2 or when the boundary surface is present only in the side gap section as in the sample 3, or even when no boundary surface is present in either the outer layer section or the side gap section as in the sample 4.

DESCRIPTION OF REFERENCE SYMBOLS

| | |
|---|---|
| 1 | laminated ceramic capacitor |
| 2, 12 | laminated body |
| 3 | ceramic layer |
| 4, 5 | internal electrode |
| 8, 9 | external electrode |
| 13 | large grain region |
| 14 | small grain region |
| 15 | boundary surface |
| 16 | element section |

The invention claimed is:

1. A method for manufacturing a laminated ceramic electronic component, the method comprising:
   providing a raw laminated body including a plurality of stacked ceramic layers and internal electrodes formed along specific interfaces between the ceramic layers; and
   firing for sintering the raw laminated body,
   wherein the firing is in accordance with a temperature profile in which an average rate of temperature increase is 40° C./second or more.

2. The method for manufacturing a laminated ceramic electronic component according to claim 1, wherein the average rate of temperature increase is 100° C./second or more.

3. The method for manufacturing a laminated ceramic electronic component according to claim 1, further comprising degreasing the raw laminated body before firing.

4. The method for manufacturing a laminated ceramic electronic component according to claim 3, wherein the internal electrodes comprise a base metal, and the firing is carried out in an atmosphere with an excess amount of oxidizing atmosphere gas with respect to a balance oxygen partial pressure of the base metal.

5. The method for manufacturing a laminated ceramic electronic component according to claim 4, wherein the temperature profile includes cooling after reaching the maximum temperature, and the cooling is commenced at about the time the maximum temperature is attained.

6. The method for manufacturing a laminated ceramic electronic component according to claim 1, further comprising degreasing the raw laminated body before firing.

7. The method for manufacturing a laminated ceramic electronic component according to claim 6, wherein the internal electrodes comprise a base metal, and the firing is carried out in an atmosphere with an excess amount of oxidizing atmosphere gas with respect to a balance oxygen partial pressure of the base metal.

8. The method for manufacturing a laminated ceramic electronic component according to claim 7, wherein the temperature profile includes cooling after reaching the maximum temperature, and the cooling is commenced at about the time the maximum temperature is attained.

9. The method for manufacturing a laminated ceramic electronic component according to claim 1, wherein the internal electrodes comprise a base metal, and the firing is carried out in an atmosphere with an excess amount of oxidizing atmosphere gas with respect to a balance oxygen partial pressure of the base metal.

10. The method for manufacturing a laminated ceramic electronic component according to claim 1, wherein the temperature profile includes cooling after reaching the maximum temperature, and the cooling is commenced at about the time the maximum temperature is attained.

* * * * *